(12) United States Patent
Akiyama

(10) Patent No.: US 9,881,181 B2
(45) Date of Patent: Jan. 30, 2018

(54) DEVICE-INSTALLATION-INFORMATION DISTRIBUTION APPARATUS AND SYSTEM

(71) Applicant: Toshio Akiyama, Tokyo (JP)

(72) Inventor: Toshio Akiyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 240 days.

(21) Appl. No.: 14/740,704

(22) Filed: Jun. 16, 2015

(65) Prior Publication Data

US 2015/0379289 A1 Dec. 31, 2015

(30) Foreign Application Priority Data

Jun. 26, 2014 (JP) .................................. 2014-131826

(51) Int. Cl.
*G06F 21/62* (2013.01)
*G06F 9/445* (2006.01)
(Continued)

(52) U.S. Cl.
CPC ............ *G06F 21/629* (2013.01); *G06F 3/123* (2013.01); *G06F 8/61* (2013.01); *G06F 21/604* (2013.01)

(58) Field of Classification Search
CPC .......... G06F 21/629; G06F 3/123; G06F 8/61; G06F 21/604
(Continued)

(56) References Cited

U.S. PATENT DOCUMENTS 7,636,852 B1 * 12/2009 Balasubramanian ... G06F 21/41
713/182

8,261,090 B1 * 9/2012 Matsuoka ............... G06F 21/32
382/115
(Continued)

FOREIGN PATENT DOCUMENTS

JP 2004-086863 3/2004
JP 2005-025477 1/2005
(Continued)

OTHER PUBLICATIONS

U.S. Appl. No. 14/736,749, filed Jun. 11, 2015.

*Primary Examiner* — Sarah Su
(74) *Attorney, Agent, or Firm* — Oblon, McClelland, Maier & Neustadt, L.L.P.

(57) ABSTRACT

A device-installation-information distribution apparatus for distributing device installation information including a function of installing program on an information processing apparatus to enable the information processing apparatus to use a device over a network and a function of configuring operation settings of the program includes a distribution request obtaining unit configured to obtain a distribution request, which is transmitted from the information processing apparatus, requesting to distribute the device installation information, a device-installation-information update unit configured to obtain login information for use in logging into the information processing apparatus at a privilege authorized to install software based on the obtained distribution request and device installation information for the target device and update the device installation information by adding the login information to the device installation information, and a device-installation-information distribution unit configured to transmit the updated device installation information to the information processing apparatus.

6 Claims, 9 Drawing Sheets

(51) Int. Cl.
*G06F 3/12* (2006.01)
*G06F 21/60* (2013.01)

(58) Field of Classification Search
USPC .............................................. 726/26, 27, 28
See application file for complete search history.

(56) References Cited

U.S. PATENT DOCUMENTS

| | | | |
|---|---|---|---|
| 2004/0015959 A1* | 1/2004 | Kobayashi | G06F 9/4411 717/174 |
| 2009/0059272 A1 | 3/2009 | Matsushita et al. | |
| 2011/0321139 A1* | 12/2011 | Jayaraman | G06F 21/51 726/4 |
| 2012/0110574 A1* | 5/2012 | Kumar | G06F 9/45558 718/1 |
| 2012/0154848 A1* | 6/2012 | Fukudome | G06F 3/1204 358/1.14 |
| 2013/0125211 A1* | 5/2013 | Cashman | H04L 63/08 726/4 |
| 2013/0166717 A1* | 6/2013 | Kojima | G06F 3/1207 709/223 |
| 2013/0218779 A1* | 8/2013 | Kirillin | G06Q 40/02 705/72 |
| 2013/0232239 A1* | 9/2013 | Akiyama | H04L 41/0803 709/220 |
| 2013/0291062 A1* | 10/2013 | Bursell | |
| 2013/0297933 A1* | 11/2013 | Fiducia | H04L 63/0853 713/156 |
| 2014/0052860 A1* | 2/2014 | Duggal | H04L 41/00 709/225 |
| 2015/0350198 A1* | 12/2015 | Li | H04L 63/168 713/156 |
| 2015/0378649 A1* | 12/2015 | Akiyama | G06F 3/1285 358/1.15 |
| 2016/0269682 A1* | 9/2016 | Horiuchi | H04N 7/147 |

FOREIGN PATENT DOCUMENTS

| | | | |
|---|---|---|---|
| JP | 2009-059362 | 3/2009 | |
| JP | 2013-182563 | 9/2013 | |
| WO | WO 2014000281 A1 * | 1/2014 | ............ H04L 9/3263 |

* cited by examiner

| DEVICE ID | IP ADDRESS | MODEL ID | |
|---|---|---|---|
| MFP001 | XXX. XXX. XXX. XXX | model001 | |
| MFP002 | XXX. XXX. XXX. XXX | model001 | ... |
| MFP003 | XXX. XXX. XXX. XXX | model002 | |
| ... | | | |

FIG.5

| PACKAGE ID | TARGET MODEL | |
|---|---|---|
| PKG001 | model001 | |
| PKG002 | model002 | ... |
| PKG003 | model003 | |
| ... | | |

FIG.6

| LOGIN ID | PASSWORD | ADMINISTERED PC | |
|---|---|---|---|
| admin001 | xxxxxxxxxxx | pc001, pc002, pc003 ... | |
| admin002 | xxxxxxxxxxx | pc011, pc012, pc013 ... | ... |
| admin003 | xxxxxxxxxxx | pc021, pc022, pc023 ... | |
| ... | | | |

FIG.8

```
COMMUNICATION SETTINGS
MONOCHROME/COLOR SETTING
SIMPLEX/DUPLEX SETTING
SHEET TRAY SETTING
    . . .
```

FIG.11

```
USER ID
INSTALLATION-LOCATION IP ADDRESS
DRIVER-PACKAGE-STORAGE-LOCATION FILE PATH

DEVICE ID
IMAGE-PROCESSING-APPARATUS IP ADDRESS

```
PACKAGE EXECUTION COMMAND

DRIVER-PACKAGE-STORAGE-LOCATION FILE PATH

DETAIL OF CHANGE

...
```

DEVICE-INSTALLATION-INFORMATION DISTRIBUTION APPARATUS AND SYSTEM

CROSS-REFERENCE TO RELATED APPLICATIONS

The present application claims priority to and incorporates by reference the entire contents of Japanese Patent Application No. 2014-131826 filed in Japan on Jun. 26, 2014.

BACKGROUND OF THE INVENTION

1. Field of the Invention

The present invention generally relates to a device-installation-information distribution apparatus and a system.

2. Description of the Related Art

Increasing digitization of information in recent years has made image processing apparatuses such as printers and facsimiles for use in outputting digitized information and scanners for use in digitalizing documents indispensable. It is typical that such an image processing apparatus is configured as a multifunction peripheral having an image capture function, an image forming function, a communication function, and the like to be usable as a printer, a facsimile, a scanner, and a copier.

Using such an image processing apparatus via an information processing apparatus such as a PC (personal computer) such that, for example, a print job is transmitted from the information processing apparatus to cause the image processing apparatus to form and output an image is enabled by installing driver software on the information processing apparatus. It is typical for a large number of combinations of an information processing apparatus and an image processing apparatus to enable using the image processing apparatus via the information processing apparatus by installing a printer driver on the PC.

Management of using an image processing apparatus via an information processing apparatus in this manner may be carried out by granting limited privileges to users of the information processing apparatus. For example, such management may be carried out as follows. Operation settings of driver software configured to permit only monochrome printing and duplex printing for cost reduction are locked to prevent users from making unauthorized changes to the settings. Another scheme of setting a login status (login privilege level) of users logged into the information processing apparatus to a login status as a general user privilege (a general-user login privilege level) that is not authorized to modify system configuration may be employed to restrict unauthorized modification of the system configuration by a user.

However, installation of newly-added software is not permitted to the general-user login privilege level (login status) that is not authorized to modify the system configuration. Therefore, even installation of driver software that enables use of a newly-added device such as an image processing apparatus is restricted. To avoid such a disadvantage, a technique of embedding authentication information such as an ID (identifier) and a password by which login is authenticated as an administrative user to an information processing apparatus is disclosed in, for example, Japanese Laid-open Patent Application No. 2005-025477.

Therefore, it is desirable to provide a device-installation-information distribution apparatus and a system capable of avoiding a disadvantage that can occur in the following situation. Although an information processing apparatus is configured to, when program is to be installed on the information processing apparatus, change a login privilege on the information processing apparatus to a privilege authorized to install program, authentication information for use in logging into the information processing apparatus is changed.

SUMMARY OF THE INVENTION

It is an object of the present invention to at least partially solve the problems in the conventional technology.

According to an aspect of the present invention, there is provided a device-installation-information distribution apparatus for distributing device installation information including a function of installing program, the program being to be installed on an information processing apparatus to enable the information processing apparatus to use a device connected to the information processing apparatus over a network, and a function of configuring operation settings of the program, the device-installation-information distribution apparatus including: a distribution request obtaining unit configured to obtain a distribution request requesting to distribute the device installation information; a device-installation-information update unit configured to obtain login information for use in logging into the information processing apparatus, the information processing apparatus being a source of the distribution request, at a privilege authorized to install program based on the obtained distribution request and device installation information for a target device, and to update the device installation information by adding the obtained login information to the device installation information; and a device-installation-information distribution unit configured to transmit the updated device installation information to the information processing apparatus, the information processing apparatus being the source of the distribution request.

According to another aspect of the present invention, there is provided a device-installation-information distribution apparatus for distributing device installation information including information providing a function for installing program, the program being to be installed on an information processing apparatus to enable the information processing apparatus to use a device connected to the information processing apparatus over a network, and information providing a function of configuring operation settings of the program, the device-installation-information distribution apparatus including: a distribution request obtaining unit configured to obtain a distribution request requesting to distribute the device installation information; a device-installation-information update unit configured to generate request information for use by the information processing apparatus in requesting login information for use in logging into the information processing apparatus at a privilege authorized to install program based on the obtained distribution request, obtain device installation information for a target device, and update the device installation information by adding the generated request information to the device installation information; a device-installation-information distribution unit configured to transmit the updated device installation information to the information processing apparatus, the information processing apparatus being the source of the distribution request; and a login information distribution unit configured to distribute the login information in response to a request requesting for the login information based on the request information.

According to still another aspect of the present invention, there is provided a system including: an information processing apparatus configured to use a device connected to the information processing apparatus over a network; and a device-installation-information distribution apparatus for distributing information including information providing a function of installing program, the program being to be installed on the information processing apparatus to enable the information processing apparatus to use the device, and information providing a function of configuring operation settings of the program, the device-installation-information distribution apparatus including: a distribution request obtaining unit configured to obtain a distribution request requesting to distribute the device installation information; a device-installation-information update unit configured to generate request information for use by the information processing apparatus in requesting login information for use in logging into the information processing apparatus at a privilege authorized to install program, based on the obtained distribution request, and to obtain device installation information for a target device, and to update the device installation information by adding the generated request information to the device installation information; a device-installation-information distribution unit configured to transmit the updated device installation information to the information processing apparatus, the information processing apparatus being a source of the distribution request; and a login information distribution unit configured to distribute the login information in response to a request requesting for the login information based on the request information, and the information processing apparatus, in accordance with the device installation information, execute: obtaining the login information for logging into the information processing apparatus at the privilege authorized to install program; changing a login status on the information processing apparatus to a login status in the privilege authorized to install program based on the obtained login information; installing the program, the program enabling the information processing apparatus to use the device, on the information processing apparatus after the login status on the information processing apparatus is changed, and performing operation settings of the program, the program enabling the information processing apparatus to use the device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of package management information according to the embodiment;

FIG. 6 is a diagram illustrating an example of account management information according to the embodiment;

FIG. 8 is a diagram illustrating settings of a driver according to the embodiment;

FIG. 11 is a diagram illustrating an example of installation confirmation information according to a modification of the embodiment;

FIG. 12 is a diagram illustrating an example of change notice information according to the modification.

DETAILED DESCRIPTION OF THE PREFERRED EMBODIMENTS

Exemplary embodiments of the present invention are described below with reference to the accompanying drawings. An embodiment is described below by way of a particular example of a system in which an image processing apparatus such as an MFP (multifunction peripheral) is connected to an information processing apparatus such as a PC (personal computer) over a network. In the system, a feature of the embodiment resides in operations performed when driver software is installed to enable the information processing apparatus to use the MFP as well as in information used during the installation. Meanwhile, the driver software (hereinafter, sometimes referred to as "driver") according to the embodiment is software to be installed on the information processing apparatus to enable the information processing apparatus to use other device and involves various operation settings for enabling use of the device.

Figure 1:
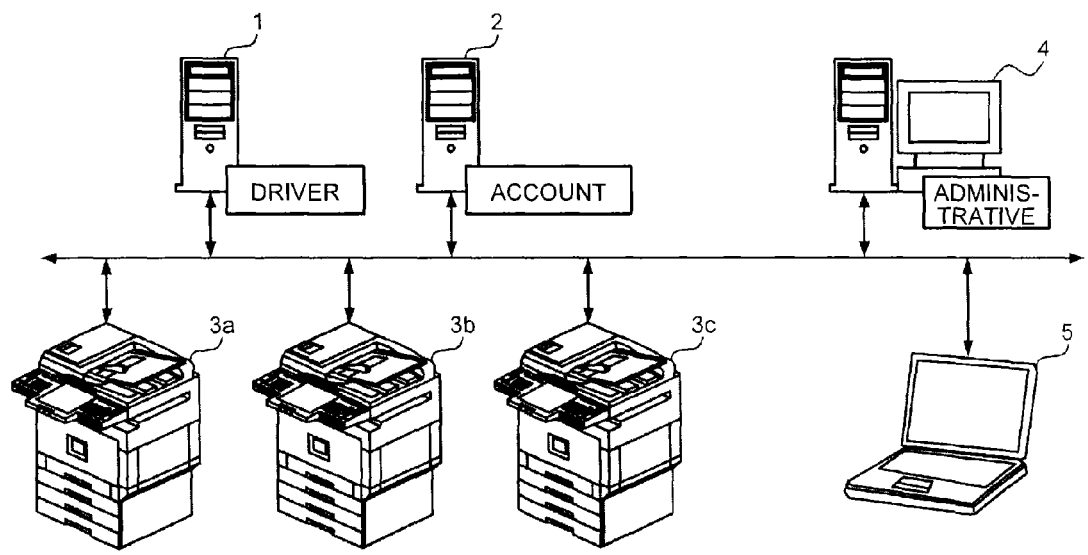
FIG. 1 is a diagram illustrating an implementation layout of a system according to an embodiment of the present invention.

FIG. 1 is a diagram illustrating an implementation layout of the system according to the embodiment. As illustrated in FIG. 1, the system according to the embodiment includes a driver server 1, an account server 2, a plurality of image processing apparatuses denoted by 3a, 3b, and 3c (hereinafter, collectively referred to as "image processing apparatuses 3"), an administrative terminal 4, and a PC 5. The components illustrated in FIG. 1 are connected to each other over a network such as an office LAN (local area network) and mutually communicable.

The driver server 1 according to the embodiment is a device-installation-information distribution apparatus that manages a driver package, which is information for use when driver software that enables the PC 5 to use the image processing apparatus 3 over the network is installed on the PC 5, and distributes the driver package in response to a request from the PC 5. Program instructions (software) for causing the driver server 1 to operate are used as a device-installation-information distribution program. The account server 2 is a server that manages account information of users that operate the PC 5 and account information of an administrative user that manages the PC 5.

Each of the image processing apparatuses 3 is an MFP having an image forming/output function and an image reading function. The administrative terminal 4 performs registering a driver package of an image processing apparatus when the image processing apparatus is newly connected to the network, updating information when an administrator password of the PC 5 is changed, and the like. The PC 5 is an information processing apparatus that installs driver software by downloading a driver package from the driver server 1 and uses the image processing apparatuses 3 over the network.

Note that the PC 5 according to the embodiment is configured to assign a general-user privilege level that is not authorized to modify various settings to each user logged into the PC 5 to prevent unauthorized modification of the settings and unauthorized installation of additional software by the user, so that the PC 5 is used in manners and for purposes intended by the administrative user. However, to enable the PC 5 to use the image processing apparatuses 3, it is necessary to install driver software for the respective image processing apparatuses 3. Accordingly, the need of logging into the PC 5 as an administrator arises. It is assumed that an aspect of the invention embodied in the embodiment is applied to such a situation.

A hardware configuration of the information processing apparatus corresponding to each of the devices that make up the system according to the embodiment is described below with reference to FIG. 2. Note that each of the image processing apparatuses 3 includes, in addition to the hardware components illustrated in FIG. 2, engines to function as a scanner, a printer, and the like.

Figure 2:
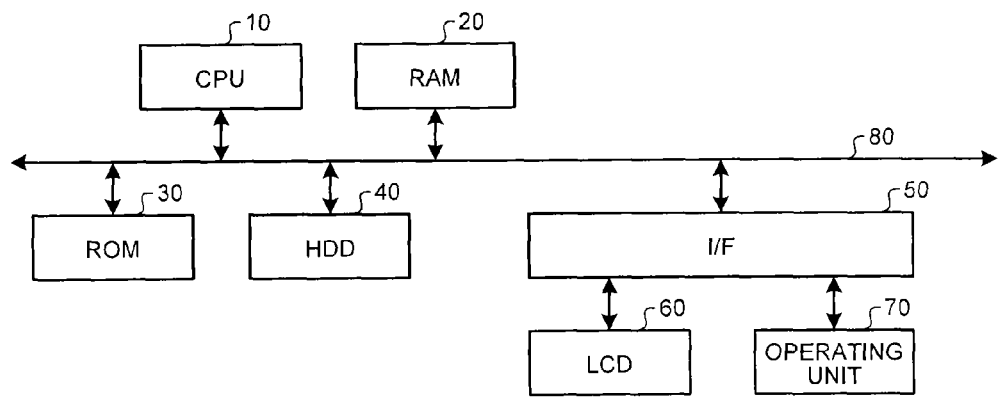
FIG. 2 is a block diagram illustrating a hardware configuration of an information processing apparatus according to the embodiment.

As illustrated in FIG. 2, the information processing apparatus according to the embodiment includes components similar to those of a typical server, a PC, or the like. More specifically, the information processing apparatus according to the embodiment includes a CPU (central processing unit) 10, a RAM (random access memory) 20, a ROM (read only memory) 30, an HDD (hard disk drive) 40, and an I/F 50 that are connected to each other via a bus 80. An LCD (liquid crystal display) 60 and an operating unit 70 are connected to the I/F 50.

The CPU 10 is a computing unit that provides overall control of operations of the information processing apparatus. The RAM 20 is a volatile storage medium to and from which information is writable and readable at high speed and used as a working area when the CPU 10 executes information processing. The ROM 30 is a read-only non-volatile storage medium where software such as firmware is stored. The HDD 40 is a non-volatile storage medium to and from which information is writable and readable and in which an operating system (OS), various control software, application software, and the like are to be stored.

The I/F 50 connects and controls between the bus 80, and hardware of various types, the network, and the like. The LCD 60 is a visual user interface providing visual display of a condition of the information processing apparatus for a user(s). The operating unit 70 is an interface, such as a keyboard or a mouse, for use by a user to enter information to the information processing apparatus. Meanwhile, each of the driver server 1 and the account server 2 according to the embodiment is operated as a server that is not directly manipulated by a user. Accordingly, user interface such as the LCD 60 and the operating unit 70 may be omitted from the driver server 1 and/or the account server 2.

With such a hardware configuration as described above, the CPU 10 executes processing according to software stored in the ROM 30, or software read out from the HDD 40 or a storage medium such as an optical disk (not shown) and loaded into the RAM 20, thereby implementing a software control unit. Functional blocks that provide functions of the image processing apparatus such as the driver server 1 according to the embodiment are implemented in a combination of the software control unit implemented in this manner and hardware.

Figures 3, 4:
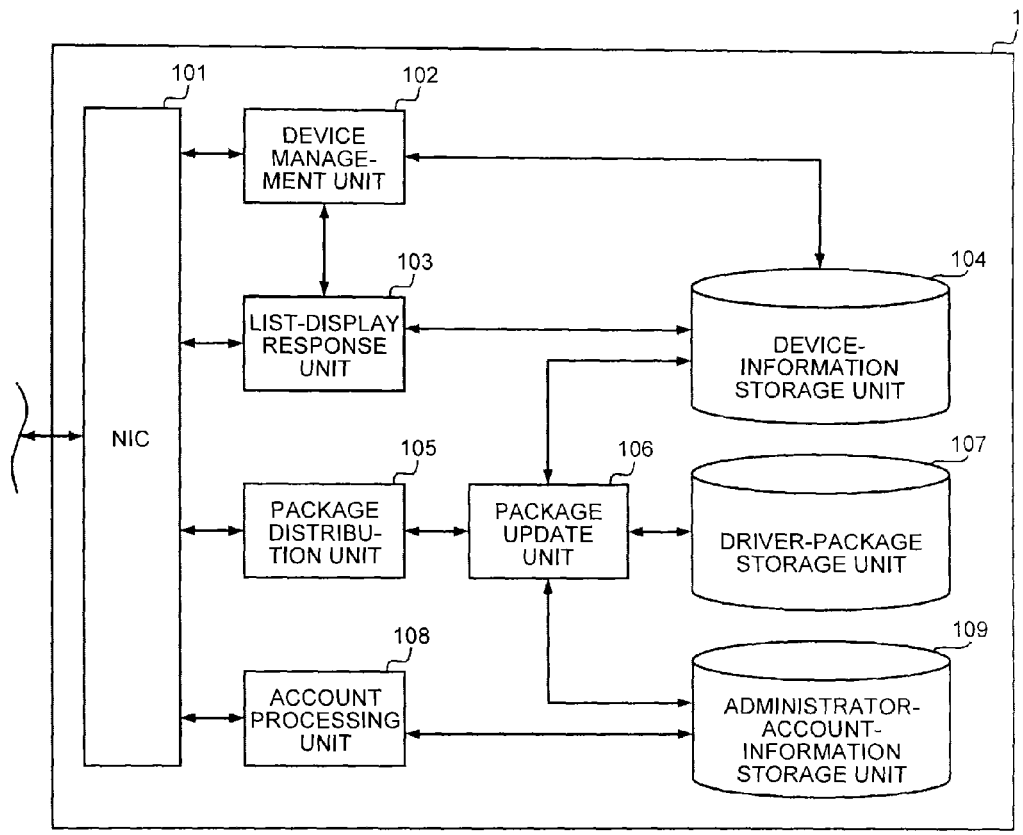
FIG. 3 is a block diagram illustrating a functional configuration of a driver server according to the embodiment.
FIG. 4 is a diagram illustrating an example of device management information according to the embodiment.

A functional configuration of the driver server 1 according to the embodiment is described below with reference to FIG. 3. FIG. 3 is a block diagram illustrating the functional configuration of the driver server 1 according to the embodiment. As illustrated in FIG. 3, the driver server 1 according to the embodiment includes an NIC (network interface card) 101, a device management unit 102, a list-display response unit 103, a device-information storage unit 104, a package distribution unit 105, a package update unit 106, a driver-package storage unit 107, an account processing unit 108, and an administrator-account-information storage unit 109.

The NIC 101 is a communication interface that allows the driver server 1 to exchange information with other device over the network. The device management unit 102 obtains information related to communication (hereinafter, "communication information") such as IP addresses of the image processing apparatuses 3 over the network and causes the information to be stored in the device-information storage unit 104. The communication information of each of the image processing apparatuses 3 stored in this manner is managed in the driver server 1.

The device management unit 102 according to the embodiment transmits, by broadcasting for example, a request for information to the image processing apparatuses 3 with which the driver server 1 is communicable over the network and obtains the information returned as a response to the request. The device management unit 102 causes device management information to be stored in the device-information storage unit 104 based on the obtained information. The device management information will be described later.

The list-display response unit 103 generates, in response to a request received from the PC 5 to display a list, a list of the image processing apparatuses 3 driver packages therefor are managed by the driver server 1 by accessing information stored in the device-information storage unit 104 and transmits the list to the PC 5. The device-information storage unit 104 stores and manages the information about the image processing apparatuses 3 managed by the system according to the embodiment. The device management information stored in the device device-information storage unit 104 is described below with reference to FIG. 4.

As illustrated in FIG. 4, the device management information contains "device ID", "IP address", and "model ID" information. The "device ID" is identification information for individually identifies the image processing apparatuses 3. The "IP address" is the address, on the network, of each of the image processing apparatuses 3 in the system according to the embodiment. The "model ID" is identification information indicating a model of each of the image processing apparatuses 3. In the example illustrated in FIG. 4, an image processing apparatus "MFP001" and an image processing apparatus "MFP002" are of a same model "mode1001".

The package distribution unit 105 transmits a driver package over the network in response to a request received from the PC 5. More specifically, upon receiving a driver-package distribution request from the PC 5, the package distribution unit 105 transmits a driver package request to the package update unit 106.

The package update unit 106 obtains the driver package requested by the package request received from the package distribution unit 105 and, furthermore, updates information contained in the driver package using information obtained from the device-information storage unit 104 and the administrator-account-information storage unit 109 and passes the driver package to the package distribution unit 105. Functions of the package update unit 106 will be described later.

The driver-package storage unit 107 is a storage unit where the driver packages that enable use of the image processing apparatuses 3 managed in the embodiment and package management information for use in managing the driver packages are stored. Thus, the driver-package storage unit 107 functions as a device-installation-information management unit. As illustrated in FIG. 5, the package management information according to the embodiment contains "package ID" and "target model" information.

The "package ID" is identification information for individually identifies the driver packages. The "target model" is information indicating a model of the image processing apparatus 3 for which the driver package identified by a package ID is provided and corresponds to the "model ID" described earlier with reference to FIG. 4.

Thus, in the system according to the embodiment, the driver packages are managed on a per-model basis of the image processing apparatuses 3 rather than on a per-apparatus basis of the image processing apparatuses 3. Because duplication of management of driver packages of a same model is eliminated, information management can be carried out efficiently. In the example according to the embodiment, driver package management for the image processing apparatus "MFP001" and the image processing apparatus "MFP002" can be done by managing a single driver package.

The account processing unit 108 updates information stored in the administrator-account-information storage unit 109 as instructed by the administrative terminal 4. The administrator-account-information storage unit 109 is a storage unit where a login ID and a password for using the PC 5 as an administrative user are stored. The account management information stored in the administrator-account-information storage unit 109 is described below with reference to FIG. 6.

As illustrated in FIG. 6, the account management information contains "login ID", "password", and "administered PC" information. The "login ID" is identification information for identifying an administrative user who can log into the PC 5 according to the embodiment as an administrator. The "password" information is passwords for the respective login IDs. The "administered PC" is information indicating PCs login to which as an administrative user can be made with the "login ID".

The system of minimum configuration illustrated in FIG. 1 includes only the single PC 5; however, in practice, as many PCs as users who use the system will be connected to the system. The PCs are not all managed by a single administrative user but are generally managed by a plurality of administrative users sharing the burden of managing the PCs. Accordingly, as illustrated in FIG. 6, each of the login IDs is associated with a plurality of PCs which are the "administered PC".

The information illustrated in FIG. 6 is accumulated by picking up administrator authentication information of the PC 5 and the other information processing apparatuses connected to the system from account information of users and administrative users managed by the account server 2. This process may be manually performed by an administrative user who manipulates the administrative terminal 4 as described earlier. Alternatively, a configuration in which the account processing unit 108 cooperates with the account server 2 to thereby automatically obtain the administrator authentication information managed in the account server 2 and updates the information stored in the administrator-account-information storage unit 109 with the obtained administrator authentication information may be employed.

The package update unit 106 is notified of the "device ID" illustrated in FIG. 4 when the package update unit 106 receives the driver package request from the package distribution unit 105. The package update unit 106 accesses the device management information illustrated in FIG. 4 for the notified "device ID" and obtains "model ID" associated with the "device ID". The package update unit 106 accesses the package management information illustrated in FIG. 5 for the obtained "model ID" to identify a driver package for the "model ID" and obtains the thus-identified driver package.

Furthermore, the package update unit 106 obtains an IP address of the target image processing apparatus 3 from the device management information and administrator authentication information of the PC 5 that has requested to install the driver package from the account management information, and updates the driver package with these information pieces.

Figure 7:
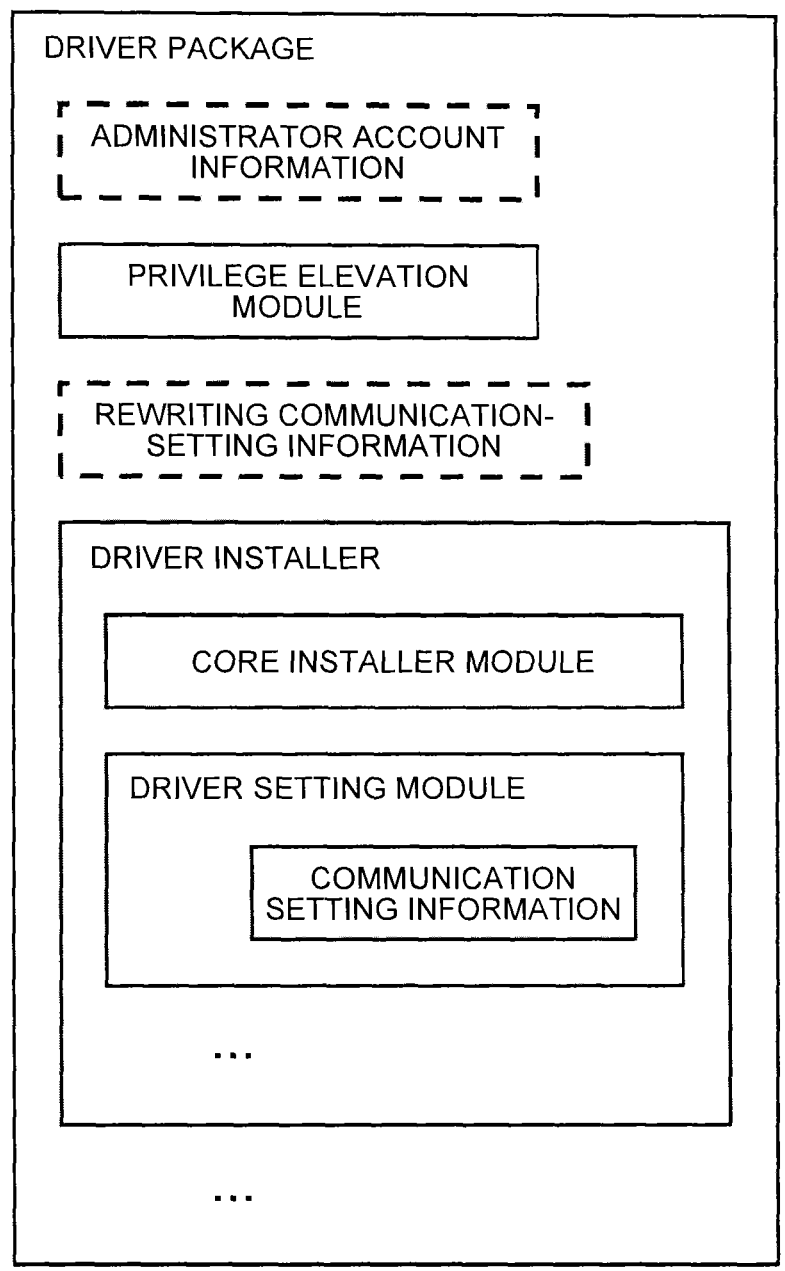
FIG. 7 is a diagram illustrating a data structure of a driver package according to the embodiment.

Information contained in the driver package updated by the package update unit 106 according to the embodiment is described below with reference to FIG. 7. FIG. 7 is a diagram illustrating the information contained in the driver package according to the embodiment. As illustrated in FIG. 7, the driver package according to the embodiment contains "administrator account information", "privilege elevation module", "rewriting communication-setting information", and "driver installer" information. In FIG. 7, information inside the dashed line frames is information added by the package update unit 106 when the driver package is distributed.

The "administrator account information" is authentication information of the administrative user of the PC 5 to which the driver package is distributed and, more specifically, "login ID" and "password" obtained by the package update unit 106 from the account management information. Embedding the "administrator account information" in the driver package allows, for execution of driver installation on the PC 5 using the driver package, making transition of a login privilege level (login status) as a general user to a login privilege level (login status) as an administrator. Thus, the "administrator account information" is used as login information.

In the embodiment, the "administrator account information" is not contained in the driver package in advance. Instead, the package update unit 106 obtains the "administrator account information" and adds the information to the driver package when the driver package is distributed as described above. If the "login ID" and the "password" illustrated in FIG. 6 were invariant, the "administrator account information" may be contained in the driver package in advance. However, the "login ID" and the "password" are changed at regular intervals. Accordingly, the scheme of the embodiment of obtaining the "login ID" and the "password" and adding them to the driver package when the driver package is distributed allows embedding correct "administrator account information" in the driver package even if the "login ID" and the "password" are changed at regular intervals.

Meanwhile, the "administrator account information" is provided to elevate a login privilege level on the PC 5 from a general-user privilege level to a privilege level authorized to install software on the PC 5. For this reason, the "administrator account information" is not necessarily login information for the administrative user but can be any login information for a privilege with which software can be installed on the PC 5.

The "privilege elevation module" is software program information that executes processing for making transition of the general-user login privilege level to the administrative-user login privilege level when the driver is installed on the PC 5 using the driver package. In the PC 5, the CPU 10 executes processing in accordance with the "privilege elevation module" software and accesses the "administrator account information", thereby performing process elevation of elevating from the general-user login privilege level to the administrative-user login privilege level. Thus, the "privilege elevation module" is used as login-privilege-level changing information.

The "rewriting communication-setting information" is communication setting information including the IP address of the image processing apparatus 3 use of which is enabled by installing the driver package and, more specifically, the "IP address" obtained by the package update unit 106 from the device management information. Although an example in which an IP address is used as the rewriting communication-setting information is described in the embodiment, the rewriting communication-setting information is not limited thereto. Alternatively, other information than the IP address such as a host name or a URL (uniform resource locator) can be used as the rewriting communication-setting information.

The "driver installer" is information for installing the driver software for the target image processing apparatus 3 use of which by the PC 5 is to be enabled. As illustrated in FIG. 7, the "driver installer" includes "core installer module" and "driver setting module".

The "core installer module" is a software program that implements a function of installing the printer driver so that the PC 5 can drive and control the image processing apparatus 3 over the network. The "driver setting module" is a software program that implements a function of configuring operation settings of the installed printer driver. It should be noted that the driver setting module according to the embodiment provides a function of configuring communication settings to enable the driver software installed on the PC 5 using the driver package to communicate with the image processing apparatus 3.

As illustrated in FIG. 7, the "driver setting module" includes "communication setting information". The communication setting information is information to be accessed to configure the communication settings of the target image processing apparatus 3 when the CPU 10 of the PC 5 configures the operation settings by executing processing in accordance with the "driver setting module".

In contrast thereto, in the system according to the embodiment, when the driver package is distributed, the package update unit 106 obtains the IP address from the device management information and embeds the IP address in the driver package as the "rewriting communication-setting information". Accordingly, when the operation settings are configured by the function provided by the "driver setting module" in the PC 5, the communication settings are configured only after being rewritten with the "rewriting communication-setting information". The reason why the communication settings are configured in this manner is described below.

When, for example, a Windows (registered trademark) OS is used as system software of the PC 5, the "driver installer" is an installer file with extension "msi". If the installer file is configured to access information outside the file, structure of the installer file becomes complicated, which is undesirable. Accordingly, it is preferable that information to be accessed by the "core installer module" or the "driver setting module" is included in the "driver installer".

In contrast thereto, as described earlier, the system according to the embodiment is configured to make transition from the general-user login privilege level to the administrative-user login privilege level before executing installation. Accordingly, communication settings of the installed printer driver are to be configured in the state where the transition to the administrator login privilege level has been made. For this reason, it is preferable to embed information, such as the "IP address", for use in configuring the communication settings in the driver package.

However, as described earlier with reference to FIG. 5, the driver installers are in one-to-one correspondence with the models of the image processing apparatuses 3 rather than in one-to-one correspondence with the image processing apparatuses 3. Accordingly, the driver packages cannot be stored in the driver-package storage unit 107 such that the communication setting information embedded in the driver installers is associated with the image processing apparatuses 3 on the per-apparatus basis.

However, the problem described above can be resolved by, as described earlier, causing the "rewriting communication-setting information" to be embedded in the driver package when the driver package is distributed and overwriting the "communication setting information" embedded in the driver package with the "rewriting communication-setting information" when settings are configured by the function provided by the "driver setting module". Thus, the "communication setting information" is information corresponding to an identifier, on the network, of the device use of which via the PC 5 is to be enabled and is a tentative identifier registered in advance.

The driver package according to the embodiment is configured as a compressed file having a self-extracting capability and configured to follow a scenario of automatically executing the modules. Accordingly, in the PC 5 that has obtained the driver package illustrated in FIG. 7, the CPU 10 executes processing in accordance with software information included in the driver packages; as a result, the driver software is automatically installed and operation settings of the driver software are automatically configured.

Although the "communication setting information" contained in the driver installer is dummy data that is to be rewritten when the driver package is distributed, it is preferable that the "communication setting information" is set to an actual address of the image processing apparatus 3 for which the driver installer is provided rather than to meaningless data or blank data. This is because, if the "communication setting information" is set to the actual address, operation check of the driver installer generated as an msi file is enabled.

As described above, the driver package according to the embodiment is information providing the function of installing driver software, which is software to be installed on the PC 5 to enable the PC 5 to use the image processing apparatus 3 over the network, and the function of configuring operation settings of the driver software. Thus, the driver package is used as device installation information and device installation program that enables the PC 5 to use a device.

FIG. 8 is a diagram illustrating settings to be applied when the CPU 10 of the PC 5 executes processing in accordance with the "driver setting module". As illustrated in FIG. 8, the function provided by the "driver setting module" configures, in addition to the "communication settings" described above, "monochrome/color setting", "simplex/duplex setting", and "sheet tray setting" to be applied when the PC 5 uses the image processing apparatus 3 in forming/outputting an image.

How a driver package is distributed and installed according to the embodiment is described below. FIG. 8 is a sequence diagram illustrating how the system according to the embodiment operates. As illustrated in FIG. 8, a user who desires to use one of the image processing apparatuses 3 requests the driver server 1 for a list of available one(s) of the image processing apparatuses 3 by manipulating the PC 5. The PC 5 manipulated in this manner transmits a request for the list to the driver server 1 (S901).

In the driver server 1 that receives the list request transmitted at S901, the list-display response unit 103 obtains the request and generates list information based on device information obtained from the device-information storage unit 104. At this time, the available image processing apparatus(es) 3 can be selected (or narrowed down) in a PC-dependent or user-dependent manner by selecting the image processing apparatus(es) 3 to be included in the list based on the identification information of the PC 5 that has issued the request (hereinafter, "requesting PC 5") and information about a user logged into the PC 5.

The list-display response unit 103 transmits the list information to the requesting PC 5 (S902). Upon receiving the list information, the PC 5 causes the list of the available image processing apparatus(es) 3 to be displayed on the LCD 60 based on the received list information, and accepts a selection made by the user on the displayed list (S903). When the target image processing apparatus 3 use of which via the PC 5 is desired is selected by the user, the PC 5 sends notification of the selected device to the driver server 1 (S904).

Put another way, a request to distribute a driver package for the selected device is transmitted at S904. In the driver server 1, the package distribution unit 105 obtains the notification of the selected device and sends the notification to the package update unit 106. Thus, at S904, the package distribution unit 105 functions as a distribution-request obtaining unit.

In the driver server 1, the package distribution unit 105 obtains the notification of the selected device and passes the notification to the package update unit 106. As described earlier, this notification is made by sending identification information of the image processing apparatus 3, which is the selected device, and identification information of the requesting PC 5. The package update unit 106 accesses the device-information storage unit 104 for "model ID" using the identification information of the image processing apparatus 3 and obtains the driver package indicated by the "model ID" from the driver-package storage unit 107 (S905).

Thereafter, the package update unit 106 obtains administrator account information from the administrator-account-information storage unit 109 using the identification information of the requesting PC 5 (S906). Furthermore, the package update unit 106 obtains communication setting information from the device-information storage unit 104 using the identification information of the target image processing apparatus 3 (S907).

Upon obtaining these information pieces, the package update unit 106 updates the driver package by embedding the "administrator account information" and the "rewriting communication-setting information" in the driver package as described earlier with reference to FIG. 7 (S908). Thus, the driver-package update unit 106 functions as a device-installation-information update unit.

The driver package updated by the package update unit 106 is transmitted to the requesting PC 5 by the package distribution unit 105 (S909). Thus, the package distribution unit 105 functions as a device-installation-information distribution unit.

In the PC 5 that receives the driver package, the CPU 10 executes processing in accordance with information contained in the driver package; as a result, the drive package, which is a compressed file as described earlier, is automatically decompressed (S910). After the drive package has been decompressed, the CPU 10 executes processing in accordance with scenario information contained in the driver package. First, process elevation of elevating the login privilege level on the PC 5 from the general-user privilege level to the administrator privilege level is performed by the function provided by the "privilege elevation module" (S911).

By the transition to the administrator login privilege level made at S911, installation of a new software program on the PC 5 is enabled. Thereafter, the CPU 10 executes processing in accordance with the core installer module, thereby installing a core module of the driver software (S912).

When the core module has been installed, the driver setting module configures settings. Before the settings are configured, the "communication setting information" included in the driver setting module is overwritten with the "rewriting communication-setting information" as described earlier with reference to FIG. 7 (S913).

The CPU 10 executes processing in accordance with the driver setting module, thereby configuring operation settings of the driver (S914). At S914, operation settings for such items as those described with reference to FIG. 8 are configured. Installation of the driver software using the driver package and operation settings according to the embodiment are thus completed.

As described above, in the system according to the embodiment, even if the PC 5 on which driver software is to be installed is operated at the general-user privilege level that is not authorized to install new software, the driver software can be installed on the PC 5. This is achieved by embedding the "administrator account information" in the driver package and by making, by the function provided by the "privilege elevation module", transition to the administrator login privilege level when the driver is to be installed on the PC 5.

Furthermore, in the system according to the embodiment, the "administrator account information" is not contained in each driver package in advance. Instead, the package update unit 106 obtains the "administrator account information" from the administrator-account-information storage unit 109 and embeds the information in the driver package when the driver package is distributed in response to a request received from the PC 5. Accordingly, even if the administrator account information is changed at regular intervals, the need of updating information contained in the driver package stored in the driver-package storage unit 107 each time the administrator account information is changed is eliminated. Furthermore, even if the administrator account information varies depending on an information processing apparatus that issues a request for the driver package, installation of the driver software is enabled.

Furthermore, in the system according to the embodiment, a limitation is imposed on operations that are permitted to users who operate the PC 5 so as to prevent modification of operation settings of the installed driver software by the users, thereby obliging the users to use the PC 5 in manners intended by the administrative user. This limitation can cause a disadvantage that, after the driver software has been installed and a privilege for using the PC 5 is returned to the general-user privilege, communication settings of the PC 5 for communication with the image processing apparatus 3 cannot be configured.

However, in the system according to the embodiment, communication setting information is contained in the driver package, and communication settings for communication with the target image processing apparatus 3 are configured during a period when transition to the administrator login privilege level is made to install the driver software using the driver package and to configure operation settings. Accordingly, communication settings can be configured at installation of the driver software irrespective of operating environment of the system.

Furthermore, the communication setting information is not contained in the driver package in advance. Instead, the communication setting information for the target image processing apparatus 3 is embedded in the driver package as the "rewriting communication-setting information" when the driver package is distributed. Because the need of storing the driver packages on the per-apparatus basis of the image processing apparatuses 3 in advance is eliminated and the driver packages can be stored on the per-model basis as described earlier with reference to FIG. 5, efficiency in information to be stored can be increased.

Figure 9:
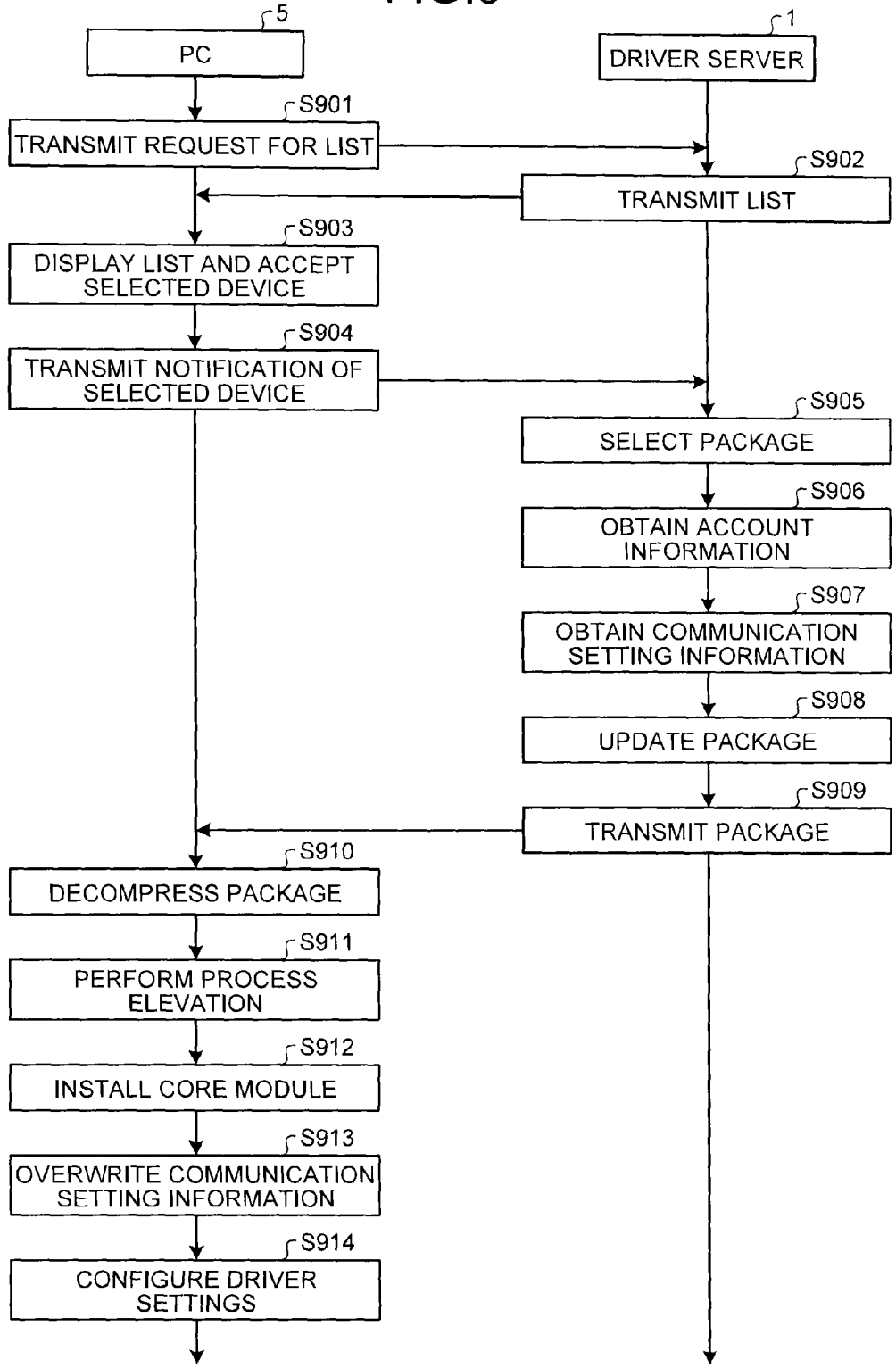
FIG. 9 is a sequence diagram illustrating how the system according to the embodiment operates.

With reference to FIG. 9, the example of distributing the driver package where, when the driver package is distributed, the "administrator account information" is embedded by the driver server 1 to the PC 5 has been described. However, this configuration is only an example, and any configuration that allows, when driver software is to be installed on the PC 5 using the driver package, accessing the "administrator account information" to make transition of the login privilege level on the PC 5 from the general-user privilege level to the administrator privilege level can be employed. Such modifications of the embodiment are described below.

Figure 10:
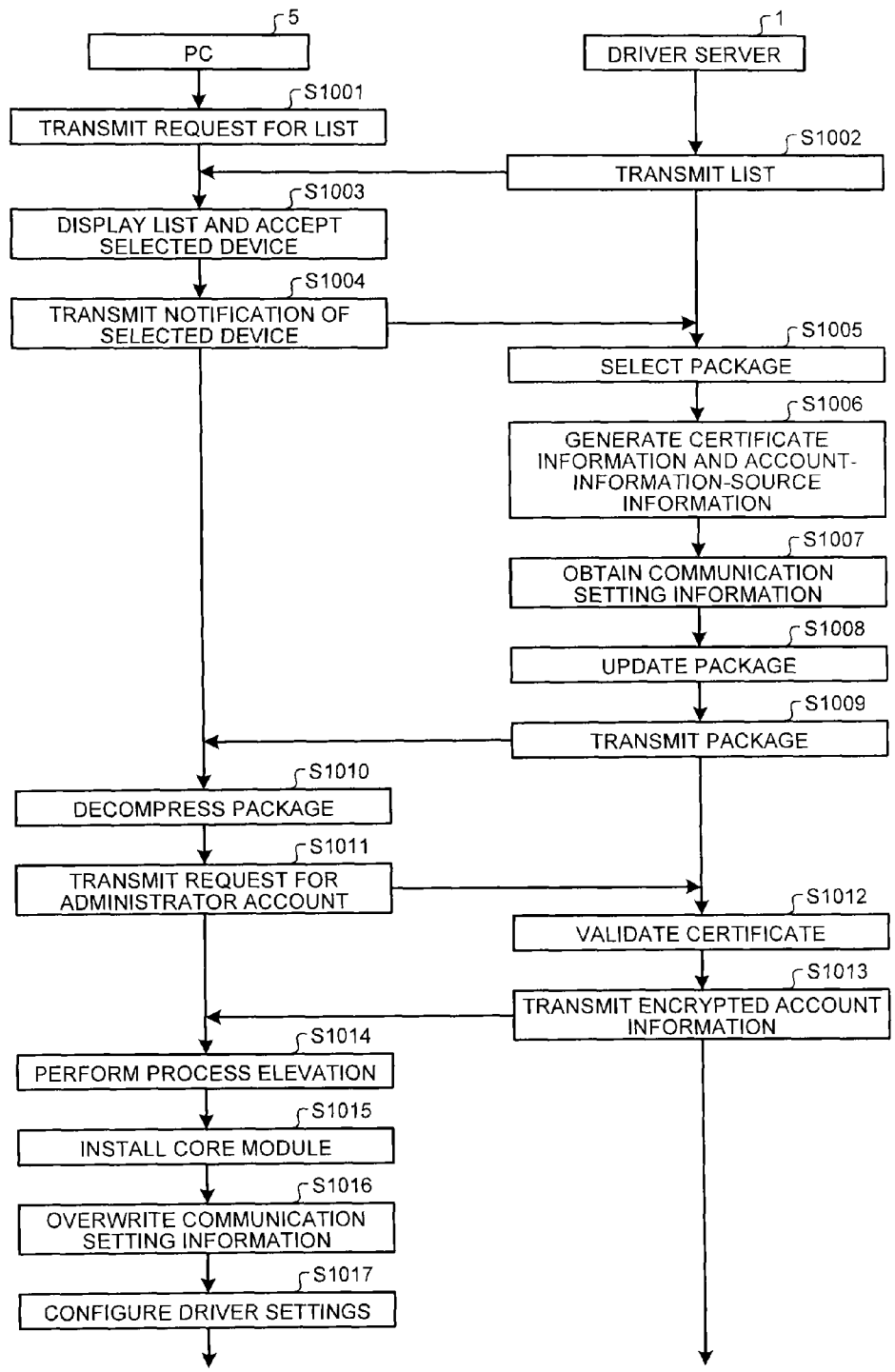
FIG. 10 is a sequence diagram illustrating how the system according to a modification of the embodiment operates.

FIG. 10 is a sequence diagram illustrating a modification of the embodiment in which the administrator account information is obtained when process elevation is performed in the PC 5. As illustrated in FIG. 10, S1001 to S1005 are performed as at S901 to S905 of FIG. 9. In the driver server 1, upon obtaining a target driver package, the package update unit 106 generates certificate information to be validated when the PC 5 obtains administrator account information and account-information-source information about an entity from which the administrator account information is to be obtained (S1006). These information pieces are used as request information by the PC 5 in requesting the driver server 1 for the administrator account information.

The account-information-source information includes, in addition to the network address of the driver server 1, an identifier for use in requesting the driver server 1 for the account information. Thereafter, S1007 to S1010 are performed as at S907 to S910 of FIG. 9. However, S1008 differs from S908 in that the package update unit 106 embeds, in the driver package, the certificate information and the account-information-source information generated at S1006 rather than the administrator account information illustrated in FIG. 7.

In the PC 5, when the driver package has been decompressed, the CPU 10 executing processing in accordance with the privilege elevation module transmits a request for an administrator account to the driver server 1 using the account-information-source information embedded in the driver package (S1011). At this time, the request is accompanied by the certificate information embedded in the driver package. In the driver server 1, upon receiving the request for the administrator account from the PC 5, the account processing unit 108 performs validation of the certificate by communicating with a certificate authority based on the added certificate information (S1012).

If the certificate is validated, the account processing unit 108 encrypts the requested administrator account information and transmits the encrypted information to the PC 5 (S1013). Thus, at S1013, the account processing unit 108 functions as a login-information distribution unit. In the PC 5, upon receiving the encrypted administrator account information, the CPU 10 executing processing in accordance with the privilege elevation module decrypts the encrypted administrator account information and performs process elevation using the decrypted information as at S911 of FIG. 9 (S1014).

Thereafter, S1015 to S1017 are performed as at S912 to S914 of FIG. 9. The operations performed by the system according to the modification illustrated in FIG. 10 are then completed. This modification can provide advantages similar to those of the embodiment described above.

The embodiment may be modified such that, when the driver server 1 distributes a driver package in response to a request received from the PC 5, identification information of the PC 5 and identification information of a user operating the PC 5 are stored as being associated with identification information of the image processing apparatus 3 for which the driver package is distributed. With this modification, in a case where a change should occur to a state of the image processing apparatus 3, the device management unit 102 can send a notification of the change to the PC 5 that has downloaded the driver package for the image processing apparatus 3 to which the change has occurred, thereby urging that the driver should be updated or settings should be changed. This modification is described below.

FIG. 11 is a diagram illustrating an example of installation confirmation information to be transmitted from the PC 5 to the driver server 1 at completion of installation and operation settings of driver software on the PC 5. As illustrated in FIG. 11, the installation confirmation information includes, as information related to the PC 5, "user ID", "installation-location IP address", and "driver-package-storage-location file path" and, as information related to the image processing apparatus 3 for which the driver software is installed, "device ID" and "image-processing-apparatus IP address". The information illustrated in FIG. 11 is used as device-installation confirmation information.

The "user ID" is identification information of the user logged into the PC 5 where the driver software is installed. The "installation-location IP address" is the IP address of the PC 5 where the driver software is installed. The "driver-package-storage-location file path" is information, e.g., a file path, indicating a storage area where the driver package downloaded to the PC 5 is stored.

The "device ID", a specific example thereof is given in FIG. 4, is identification information of the image processing apparatus 3 for which the driver software is installed. The "image-processing-apparatus IP address" is the IP address of the image processing apparatus 3 for which the driver software is installed. Such installation confirmation information as that described above is stored and managed in the driver server 1. Management of the installation confirmation information can be performed by, for example, the device management unit 102. In this case, the device management unit 102 functions as a device-installation-confirmation-information management unit.

When the IP address or device configuration of one of the image processing apparatuses 3 in the system should be changed, the device management unit 102 obtains the "device ID" of the image processing apparatus 3 to which the change has occurred and specifies installation confirmation information using the "device ID" illustrated in FIG. 11. The PC 5 and a user to be affected by the change occurred to the image processing apparatus 3 can be specified by using the "user ID" and the "installation-location IP address" in the thus-specified installation confirmation information.

Detection of occurrence of a change in the state of the image processing apparatus 3 and detection of detail of the change may be implemented by, for example, the device management unit 102. In this case, the device management unit 102 functions as a device-state-change detecting unit.

In the driver server 1 that has specified the PC 5 to be affected by the change occurred to the image processing apparatuses 3, the device management unit 102 transmits such change notice information as that illustrated in FIG. 12 to the specified PC 5. Examples of a scheme for transmitting the information include a scheme of transmitting the information through an interface of the system according to the embodiment using the "installation-location IP address" and the "user ID" and a scheme of transmitting the information to an e-mail address identified by the "user ID".

The "package execution command" illustrated in FIG. 12 is an execution command for executing the driver package. The "driver-package-storage-location file path" is information similar to that illustrated in FIG. 11. The "detail of change" is information indicating the detail of the change occurred to the image processing apparatus 3. For instance, when the IP address of the image processing apparatus 3 is changed, the "detail of change" indicates an IP address to which the IP address is changed.

Figure 13:
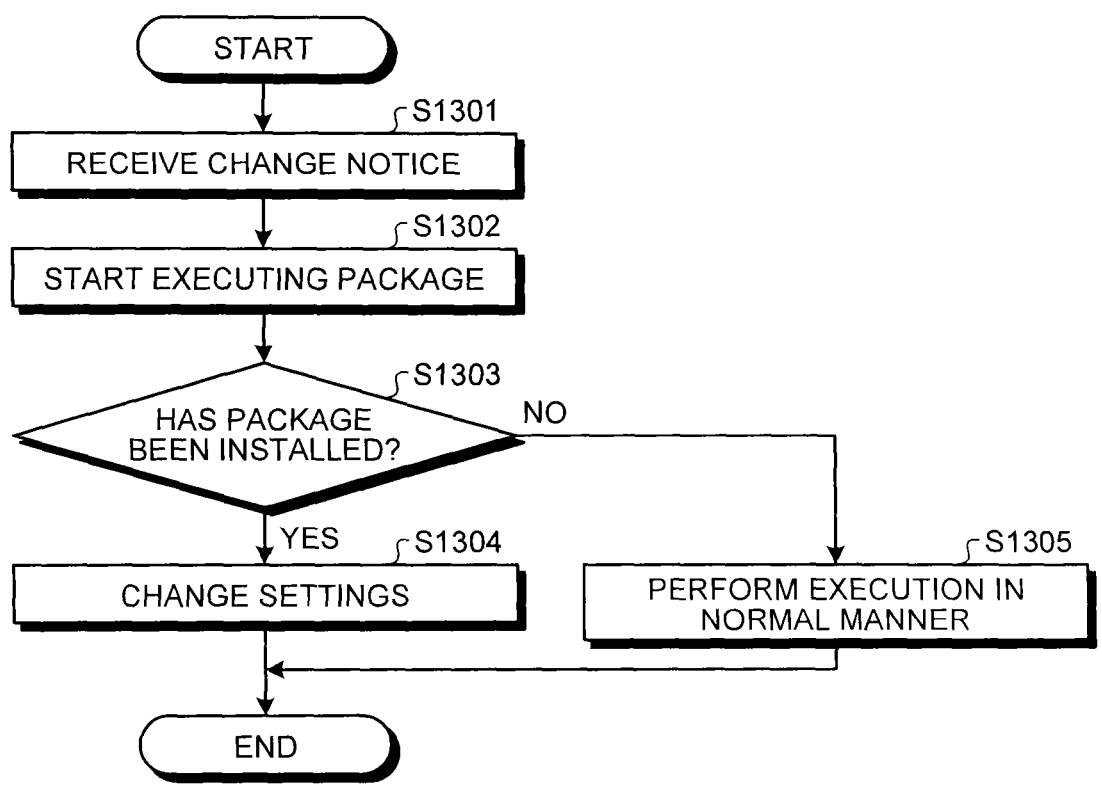
FIG. 13 is a flowchart illustrating how a PC operates upon receiving change notice information according to the modification.

How the PC 5 operates upon receiving the information illustrated in FIG. 12 is described below with reference to FIG. 13. As illustrated in FIG. 13, when the PC 5 receives the information illustrated in FIG. 12 (S1301), the CPU 10 executing processing in accordance with the "driver-package execution command" starts executing the driver package (S1302). At S1302, the target driver package is read out by tracing the "driver-package-storage-location file path" illustrated in FIG. 12.

An identifier (hereinafter, "installation completion identifier") indicating that the driver package has been installed is stored, as being associated with the installed driver package, in the PC 5 where the driver software is installed through the procedure illustrated in FIG. 9 or FIG. 10. The installation completion identifier may be stored as a file or recorded in a registry, for example.

When execution of the package is started at S1302 of FIG. 13, the CPU 10 executing processing in accordance with information contained in the driver package checks the installation completion identifier described above (S1303). If it is determined that the driver package has been installed (YES at S1303), the CPU 10 changes settings of the driver software in accordance with the "detail of change" information illustrated in FIG. 12 (S1304). In short, the CPU 10 executing processing in accordance with the information contained in the driver package checks the installation completion identifier and, when the CPU 10 has received the information illustrated in FIG. 12, changes the settings of the driver software in accordance with the "detail of change".

On the other hand, if it is determined that the driver package is not installed yet (NO at S1303), the CPU 10 executing processing in accordance with the information contained in the driver package executes the driver package as described above with reference to FIG. 9 or FIG. 10. (S1305). Thus, processing at S1303 and the following steps is implemented by the functions contained in the driver package.

This configuration of the system causes, when a change should occur to one of the image processing apparatuses 3, notification of the change is automatically provided to a user, thereby urging that the driver software should be updated. As a result, an undesirable situation that the image processing apparatus 3 becomes unusable can be avoided, and user convenience can be increased.

A configuration in which the settings are automatically changed in accordance with the "detail of change" information has been described with the example illustrated in FIG. 13. However, this is only an example. A modification in which a GUI (graphical user interface) urging a user to determine whether or not to change the settings is displayed, and whether or not to change the settings is determined in accordance with selection made by the user on the GUI may be employed. This modification makes the user aware that the need of changing the settings has arisen while preventing unintended modification of the settings.

A configuration where, when the PC 5 receives the change notice, execution of the package is automatically started in the PC 5 has been described with the example illustrated in FIG. 13. However, this is only an example. A modification in which whether or not to execute the package is determined by a user as in the above modification may alternatively be employed.

In the embodiment, the example in which the driver software to be installed is the printer driver that enables use of the image processing apparatus 3 has been described. However, this is only an example, and the driver software to be installed is not limited to printer drivers. Aspects of the invention are applicable to any driver software (e.g., driver software that enables use of a scanner) that enables use of a device over a network.

According to the present embodiments, a disadvantage that can occur in the following situation can be avoided. Although an information processing apparatus is configured to, when software is to be installed on the information processing apparatus, change a login privilege level on the information processing apparatus to a privilege level authorized to install software, authentication information for use in logging into the information processing apparatus is changed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device-installation-information distribution apparatus comprising:
  circuitry configured to
    obtain from an information processing apparatus a distribution request requesting to distribute device installation information,
    obtain, based on the obtained distribution request, login information for allowing a current login status of the information processing apparatus to be elevated to a login status having a privilege authorized to install a program enabling the information processing apparatus to use a target device connected to the information processing apparatus, and device installation information for the target device,
    update the device installation information by adding the obtained login information to the device installation information, and transmit the updated device installation information to the information processing apparatus.

2. The device-installation-information distribution apparatus according to claim 1,
wherein the device installation information includes login status changing information providing a function of changing a login status on the information processing apparatus to a login status as an administrator, and
the function provided by the login status changing information includes changing a login status on the information processing apparatus to a login status in a privilege authorized to install program, based on the login information distributed to the information processing apparatus.

3. A device-installation-information distribution apparatus comprising:
circuitry configured to
obtain from an information processing apparatus a distribution request requesting to distribute device installation information,
generate request information for use by the information processing apparatus in requesting login information for allowing a current login status of the information processing apparatus to be elevated to a login status having a privilege authorized to install a program based on the obtained distribution request, the program enabling the information processing apparatus to use a target device connected to the information processing apparatus,
obtain device installation information for the target device,
update the device installation information by adding the generated request information to the device installation information,
transmit the updated device installation information to the information processing apparatus, and
distribute the login information in response to a request requesting the login information based on the request information.

4. The device-installation-information distribution apparatus according to claim 3, wherein
the request information includes certificate information for validating the login information, and
the circuitry distributes the login information, only when the certificate information included in the request information is validated.

5. The device-installation-information distribution apparatus according to claim 3,
wherein the device installation information includes login status changing information providing a function of changing a login status on the information processing apparatus to a login status as an administrator, and
the function provided by the login status changing information includes changing a login status on the information processing apparatus to a login status in a privilege authorized to install program, based on the login information distributed to the information processing apparatus.

6. A system comprising:
an information processing apparatus configured to use a device connected to the information processing apparatus over a network; and
a device-installation-information distribution apparatus including:
circuitry configured to
obtain from the information processing apparatus a distribution request requesting to distribute device installation information,
generate request information for use by the information processing apparatus in requesting login information for allowing a current login status of the information processing apparatus to be elevated to a login status having a privilege authorized to install program based on the obtained distribution request,
obtain device installation information for a target device,
update the device installation information by adding the generated request information to the device installation information,
transmit the updated device installation information to the information processing apparatus,
distribute the login information in response to a request requesting the login information based on the request information,
wherein the information processing apparatus, in accordance with the device installation information,
obtains the login information for logging into the information processing apparatus at the privilege authorized to install program,
changes a login status on the information processing apparatus to a login status at the privilege authorized to install program based on the obtained login information,
installs the program, the program enabling the information processing apparatus to use the target device, on the information processing apparatus after the login status on the information processing apparatus is changed, and
performs operation settings of the program.

* * * * *